United States Patent [19]
D'Souza

[11] Patent Number: 6,052,707
[45] Date of Patent: *Apr. 18, 2000

[54] PREEMPTIVE MULTI-TASKING WITH COOPERATIVE GROUPS OF TASKS

[75] Inventor: David D'Souza, Kirkland, Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/667,377

[22] Filed: Jun. 21, 1996

Related U.S. Application Data

[63] Continuation of application No. 08/125,930, Sep. 21, 1993, abandoned.

[51] Int. Cl.$^7$ ...................................................... G06F 9/00
[52] U.S. Cl. .......................................... 709/106; 709/107
[58] Field of Search ...................................... 395/676, 672, 395/685, 706, 677, 673; 709/106, 102, 305, 107, 103

[56] References Cited

U.S. PATENT DOCUMENTS

| | | | |
|---|---|---|---|
| 4,658,351 | 4/1987 | Teng | 364/200 |
| 4,980,824 | 12/1990 | Tulpule et al. | 364/DIG. 7 |
| 5,311,461 | 5/1994 | Gallagher | 395/650 |
| 5,432,941 | 7/1995 | Crick et al. | 375/700 |
| 5,437,032 | 7/1995 | Wolf et al. | 395/650 |
| 5,448,735 | 9/1995 | Anderson et al. | 395/650 |
| 5,745,778 | 4/1998 | Alfieri | 395/800.01 |
| 5,909,559 | 6/1999 | So | 395/307 |

FOREIGN PATENT DOCUMENTS

| | | | |
|---|---|---|---|
| 0 400 328 | 12/1990 | European Pat. Off. | G06F 9/44 |
| 2 696 259 | 4/1994 | France | G06F 15/20 |
| 3080337 | 5/1991 | Japan | G06F 9/45 |
| 4060843 | 2/1992 | Japan | G06F 9/46 |

OTHER PUBLICATIONS

J. Prosise, "Windows Multitasking", PC Magzine, pp. 261–264, May 1994.

C. Stinson, Running Windows 3.1, 3rd ed., Microsoft Press, Bib info, 1992.

M. Pietrek, Windows Internals, The Implementation of the Windows Operating Environment, Addison–Wesley Publishing Company, pp. 213–228, 252–255, 1993.

Tanenbaum, "Modern Operating Systems"; Prentice–Hall; 1992; various pages.

Cheng, Shengchang et al., "Dynamic Scheduling of Groups of Tasks With Precedence Constraints in Distributed Hard Real–Time Systems," in *Proceedings of the Real–Time Systems Symposium*, Institute of Electrical & Electronics Engineers, New Orleans, Louisiana, Dec. 2–4, 1986, pp. 166–174.

Peterson and Silberschatz, *Operating System Concepts*, United States, 1983, Chaper 4, "CPU Scheduling," pp. 91–129.

*Primary Examiner*—Majid A. Banankhah
*Assistant Examiner*—Sue Lao
*Attorney, Agent, or Firm*—Christensen O'Connor Johnson & Kindness PLLC

[57] ABSTRACT

An operating system combines preemptive scheduling with cooperative or non-preemptive scheduling. In particular, tasks are divided into groups of interdependent tasks. Each group includes tasks that should not be run a synchronously relative to each other. The scheduler in the operating system provides each group with a time slot of processor time. The tasks within the group are cooperatively scheduled to exploit the time slot assigned to the group. Dependencies between modules and tasks are maintained to assure that no difficulties arise amongst preemptively scheduled groups.

14 Claims, 12 Drawing Sheets

Group Status Table 68

| Status Info. | Task Name |
|---|---|
| Status Info. | Task Name |
| Status Info. | Task Name |
| Status Info. | Task Name |

PREEMPTIVE MULTI-TASKING WITH COOPERATIVE GROUPS OF TASKS

CROSS-REFERENCE TO RELATED APPLICATION

This application is a continuation of United States Patent Application No. 08/125,930, filed Sept. 21, 1993, now abandoned.

TECHNICAL FIELD

The present invention relates generally to data processing systems and, more particularly, to scheduling of tasks in data processing systems.

BACKGROUND OF THE INVENTION

The Microsoft Windows, version 3.1, operating system sold by Microsoft Corporation of Redmond, Washington, is a message-driven operating system. Each program run on the operating system maintains a message queue for holding incoming messages that are destined for some portion of the program. Messages are often destined to windows generated by the program. Each window generated by a program has an associated procedure. Thus, the messages are not sent to the window per se, but rather are sent to the associated procedure Messages are retrieved and processed from the message queue by the associated program through execution of a block of code known as the "message loop". FIG. 1 is a flow chart of the steps performed by the message loop. These steps are continuously repeated in a looping fashion while the program is active. Initially, a message is retrieved from the queue by making a call to the GetMessage function (step 10). The GetMessage function is responsible for retrieving a message (if one exists) from the queue. Once the message is retrieved from the queue, the message is translated (if necessary) into a usable format by calling the TranslateMessage function, which performs some keyboard translation (step 12). Once the message is translated, the message is dispatched to the appropriate procedure by calling the DispatchMessage function (step 14). The message includes information that identifies a destination window. The information is used to properly dispatch the message.

The GetMessage function, described above, also plays a role in the scheduling of tasks in the Microsoft WINDOWS, Version 3.1, operating system. The operating system adopts a non-preemptive or cooperative multi-tasking approach. A task is a section of code, such as a subroutine or program, that can run independently. Cooperative multi-tasking refers to when tasks cooperate with each other by voluntarily passing control over a processor ("yielding") among each other. With preemptive multi-tasking, in contrast, a scheduler determines which task is given the processor and typically provides each task with a given time slot in which it may run. The GetMessage function is an example of a vehicle for implementing the cooperative multi-tasking in the operating system. Other operating system-provided functions that help implement cooperative multi-tasking include the PeekMessage, Yield and WaitMessage functions. In order to understand how the GetMessage function and the other named functions play a role in cooperative multi-tasking, it is helpful to take a closer look at the operation of the GetMessage function.

FIG. 2 is a flow chart of the steps performed by the GetMessage function when called from a first task (e.g., program) in an environment having multiple active tasks. Initially, the GetMessage function determines whether the message queue for the calling task is empty (step 16). If the message queue for the calling task is empty, the task yields (i.e., relinquishes control of) the processor to a second task that has a non-empty message queue (step 18). At some later point in time, a message becomes available in the message queue of the first task (step 20). The second task maintains control of the processor until it yields control to another task. Eventually, a task yields control back to the first task (step 22). Typically, one of the other tasks yields control back to the first task when the other task's message queue is empty, and the message queue for the first task is no longer empty. The message in the message queue of the first task is then retrieved from the message queue (step 24). On the other hand, if in step 16 it is determined that the message queue for the first task is not empty, the step of retrieving the message from the message queue is performed immediately (step 24) rather than after first performing steps 18, 20 and 22.

One difficulty with the cooperative multi-tasking approach of the Microsoft WINDOWS, Version 3.1, operating system is that a task may monopolize the processor by refusing to yield to other tasks. As long as the task has messages in its message queue, it need not yield.

SUMMARY OF THE INVENTION

In accordance with a first aspect of the present invention, a method is practiced in a data processing system having at least one processor for running tasks. The tasks are logically partitioned into groups of interdependent tasks. The groups of tasks are preemptively scheduled to be run such that each group of tasks is given a time slot in which it may run on the processor. The tasks to be run within each group are non-preemptively scheduled to be run during the time slot allocated to the group.

In accordance with a further aspect of the present invention, a method is practiced in a data processing system having at least one storage device for storing modules of code and at least one processor for running tasks. During the running of each task, at least one module of code is run. In this method, a task dependency list is provided for each task. This task dependency list lists modules that are candidates to be called when the task is run on the processor. The method may include the additional step of providing a module dependency list for each module of code. Each module dependency list lists interdependent modules of code for the module code associated with the list. In such a case, the task dependency list for each task is created by taking a logical union of the modules listed in the module dependency list that are candidates to be called when the task is run on the processor. The task dependency lists are examined to logically partition the tasks into groups of interdependent tasks. The groups of tasks are preemptively scheduled to be run such that each group of tasks is given a time slot in a cycle in which its tasks may run on the processor. For each group of tasks, the tasks are non-preemptively scheduled to be run during the time slot allocated to the group.

In accordance with a still further aspect of the present invention, a data processing system includes a partitioning mechanism for partitioning tasks into groups of interdependent tasks. The data processing system also includes an execution mechanism for executing the task. A preemptive scheduler preemptively schedules the group of tasks such that each group is given a time slot in which to execute one of its tasks. A nonpreemptive scheduler is also provided in the data processing system for nonpreemptively scheduling tasks within each group.

BRIEF DESCRIPTION OF THE DRAWINGS

FIG. 9 is an illustration of an exemplary group status table used in the preferred embodiment of the present invention.

DETAILED DESCRIPTION OF THE INVENTION

The preferred embodiment of the present invention combines preemptive multi-tasking with cooperative multi-tasking to optimize scheduling of tasks in an operating system. Specifically, tasks are logically divided into groups of interdependent tasks. As will be explained in more detail below, the interdependent tasks are related such that if they were scheduled a synchronously, code-sharing and data sharing problems could arise. A time slot of processor time is provided for each group. Scheduling within the group, however, is performed in a cooperative manner, much like that performed by the Microsoft WINDOWS, Version 3.1, operating system, sold by Microsoft Corporation of Redmond, Washington. Since groups are preemptively scheduled, one task may not monopolize the processor and slow down all executing tasks. In general, response time for task completion is improved by the present invention. Furthermore, if a task hangs, the scheduler may switch to another group so that all tasks will not hang. In addition, for compatibility reasons, the present invention ensures that dependencies among tasks are not ignored. Earlier versions of the Microsoft WINDOWS operating system used cooperative multi-tasking. Thus, applications written for such earlier versions of the operating system do not account for preemptive scheduling and, thus, dependency problems may arise when such applications are run in a preemptively scheduled environment. Failure to recognize these dependencies could cause problems in a purely preemptively scheduled environment.

Figure 1:
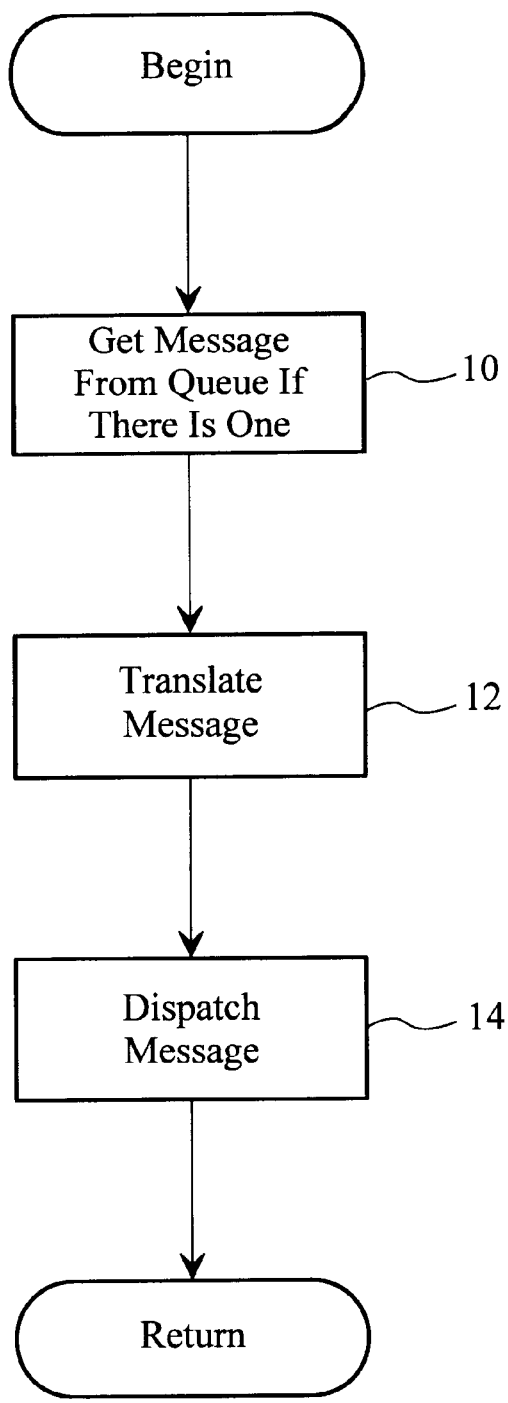
FIG. 1 is a flow chart illustrating the steps performed by a message loop in the Microsoft WINDOWS, version 3.1, operating system.
Figure 2:
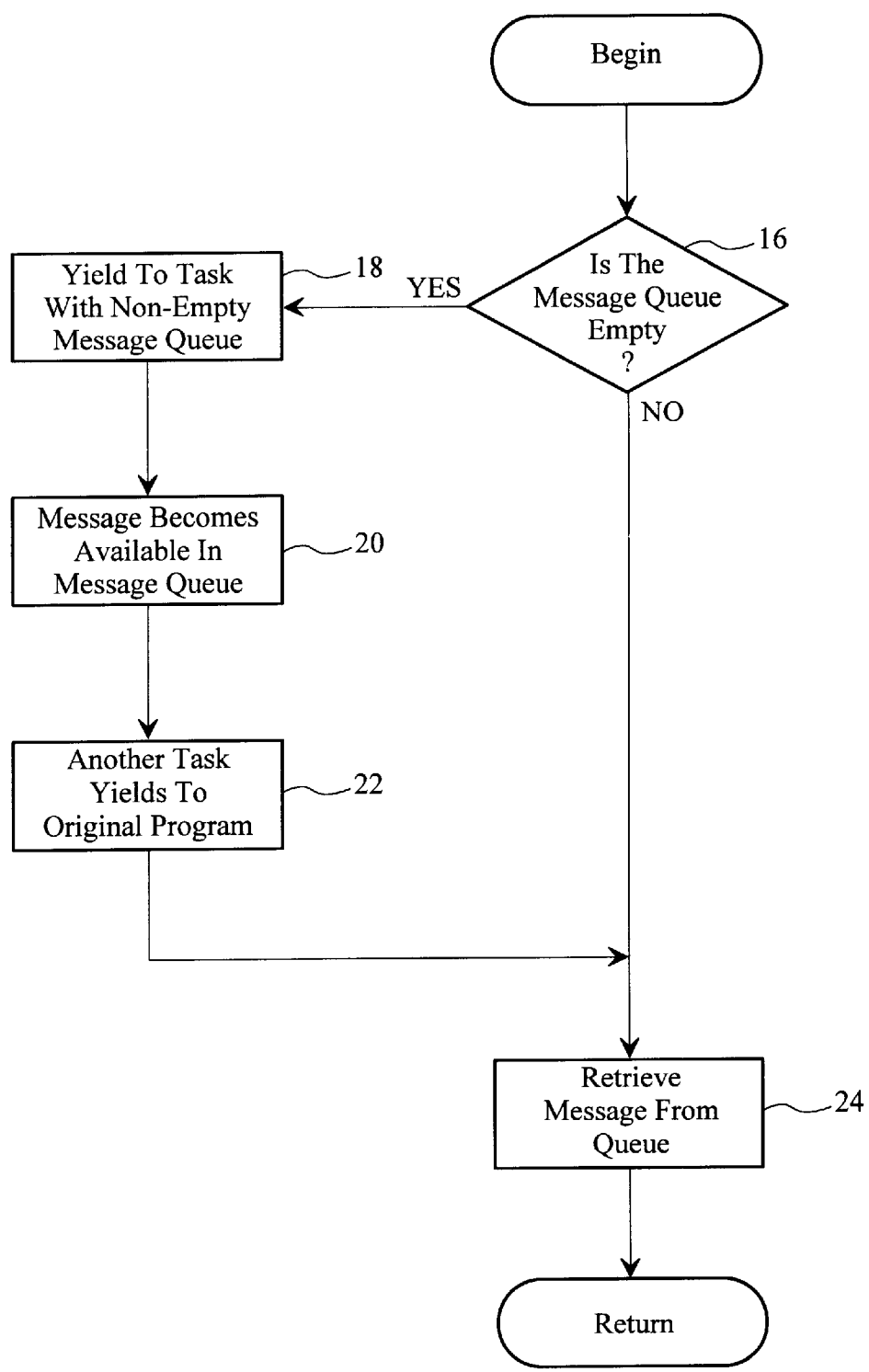
FIG. 2 is a flow chart illustrating the steps performed by the GetMessage function of the message loop of FIG. 1.
Figure 3:
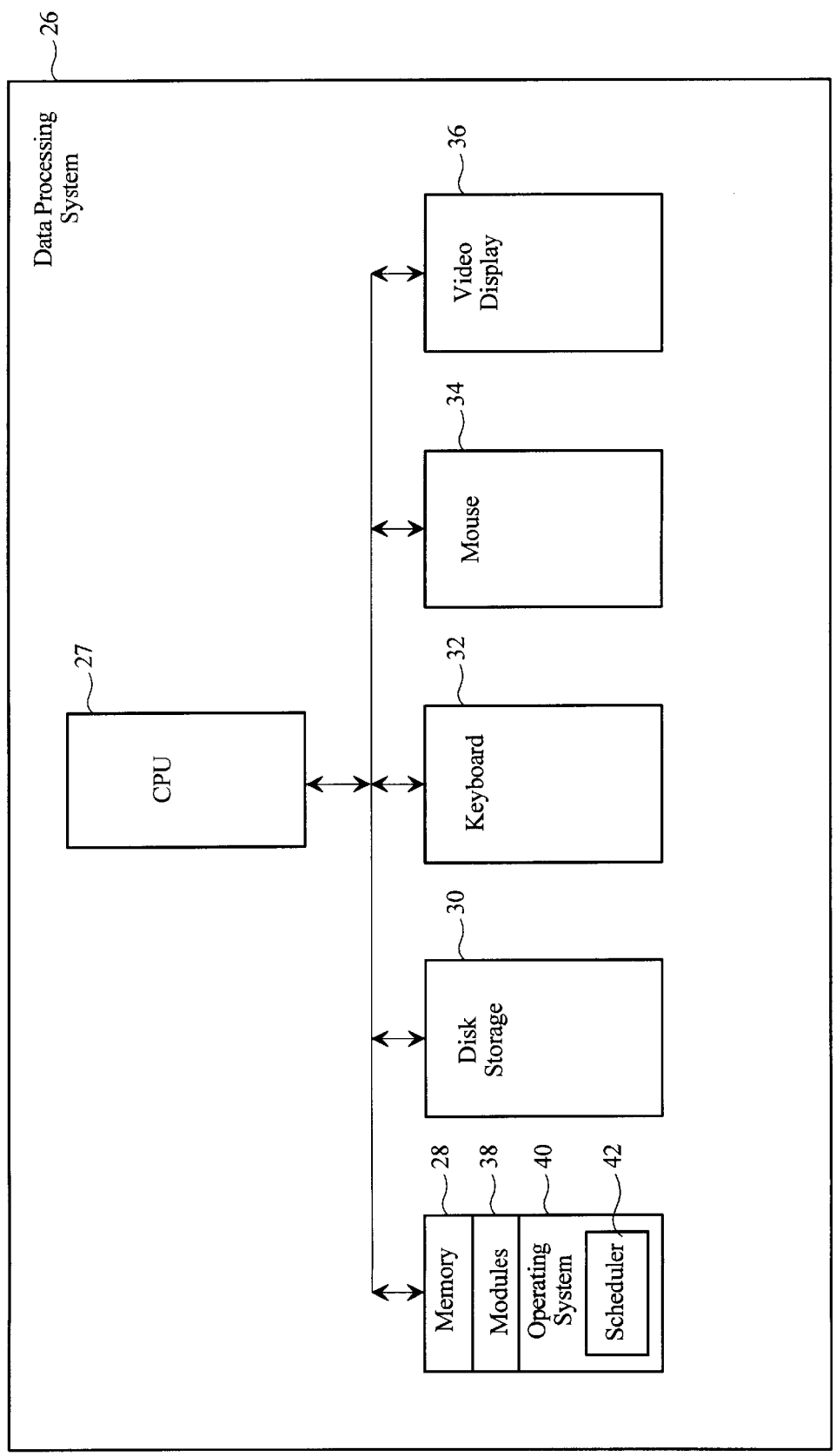
FIG. 3 is a block diagram of a data processing system that is suitable for practicing a preferred embodiment of the present invention.

The preferred embodiment of the present invention is practiced in a data processing system 26, like that shown in FIG. 3. Although the data processing system 26 shown in FIG. 3 is a single processor system, those skilled in the art will appreciate that the present invention may also be practiced in multiple processor systems, such as distributed systems. The data processing system 26 of FIG. 3 includes a central processing unit (CPU) 27 that controls operation of the system. The data processing system 26 also includes a memory 28 and disk storage 30 for storing files and data. The memory 28 may include any of multiple types of memory devices, including RAM, ROM or other well-known types of memory devices. The data processing system 26 may further include a keyboard 32, a mouse 34 and a video display 36. It should be appreciated that additional or other types of input/output devices may, likewise, be included in the data processing system 26.

The memory 28 holds a copy of an operating system 40 and modules of code 38. The operating system may be an embellished version of the Microsoft WINDOWS, version 3.1, operating system that has been embellished to support the preferred embodiment described herein. The operating system 40 includes a scheduler 42 that is responsible for scheduling the execution of tasks on the CPU 28. The preferred embodiment of the present invention is implemented, in large part, in the scheduler 42.

Figure 4:
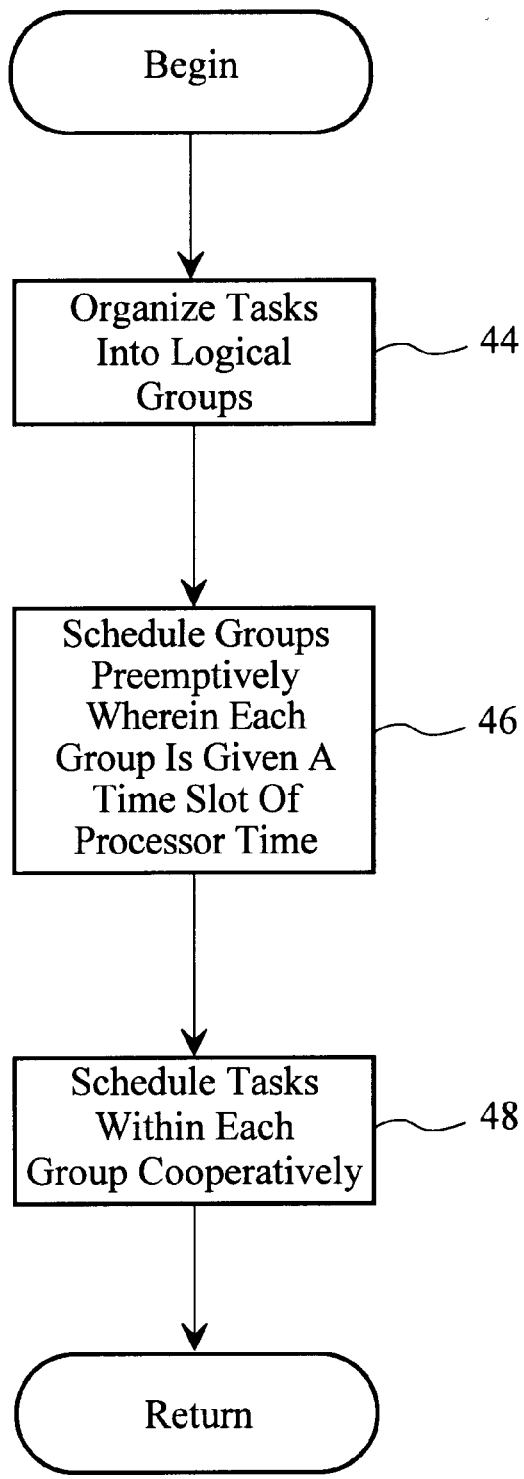
FIG. 4 is a flow chart providing a high level view of the steps performed by the preferred embodiment of the present invention in scheduling tasks for execution.

FIG. 4 is a high level flow chart showing the steps performed in the scheduling of tasks within the preferred embodiment of the present invention. First, tasks are organized into logical groups of interdependent tasks (step 44). These tasks have interdependencies such that they cannot be run in separate time slots. For instance, the tasks may call a common dynamic link library (DLL) module or other common module. If such task were run in separate time slots, a data sharing problem arises. One of the tasks might inadvertently change the data for the DLL and, thus, deleteriously affect the other tasks. The organization of tasks into logical groups is performed by the operating system 40 and will be described in more detail below. The discussion below will initially focus on the preemptively scheduling aspect of the present invention and then later focus on the cooperative scheduling aspect of the present invention.

Figure 5:
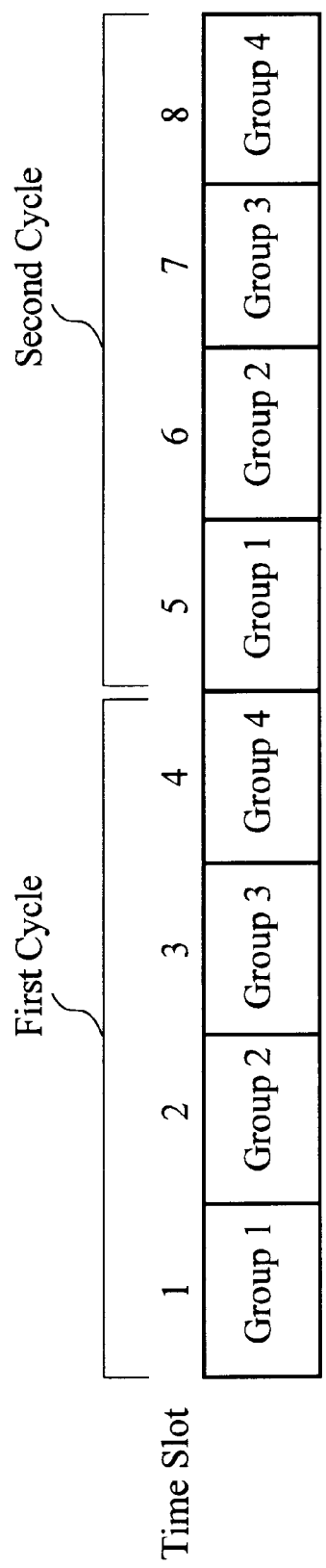
FIG. 5 is a block diagram illustrating an example of preemptive scheduling of groups in the preferred embodiment of the present invention.

The various groups of tasks to be run on the operating system 40 are scheduled preemptively such that each group is given a particular time slot of processing time to run on the CPU 28 (step 46 in FIG. 4). FIG. 5 provides an illustration of how time slots may be assigned in an instance where there are four logical groups: Group 1, Group 2, Group 3, and Group 4. In the illustration shown in FIG. 5, Group 1 is assigned time slot 1 in cycle 1 and then later assigned time slot 5 in cycle 2. In the example shown in FIG. 5, Group 2 is assigned time slot 2 in cycle 1, Group 3 is assigned time slot 3 in cycle 1, and Group 4 is assigned time slot 4 in cycle 1. Each group is assigned a corresponding time slot within the next cycle. Thus, Group 1 is assigned time slot 5 in cycle 2, Group 2 is assigned time slot 6 in cycle 2, Group 3 is assigned time slot 7 in cycle 2, and Group 4 is assigned time slot 8 in cycle 2.

As the scheduling is dynamic and groups may be added and/or removed over time, the sequence of time slots need not remain fixed; rather the scheduling may change over time. The scheduler 42, however, ensures that each active group gets a time slot in each cycle.

The scheduling of tasks within each group is not performed preemptively; rather, the scheduling is performed cooperatively (step 48 in FIG. 4). As discussed above, cooperative multi-tasking requires that a task voluntarily yield to another task. The example described in the Background section focused on the GetMessage function as a vehicle for yielding amongst tasks. In general, the cooperative multi-tasking performed within a group is performed much like scheduling is performed in the Microsoft WINDOWS, Version 3.1 operating system. As will be described in more detail below, the present invention additionally checks for dependencies before unblocking a task. API's such as -GetMessage, PeekMessage, Yield and WaitMessage allow applications to yield to other tasks in the same group.

In summary, each group is given a time slot of processor time in each cycle. Which task runs during the time slot assigned to a group depends upon cooperative scheduling of the tasks within the group. Thus, a task that is currently running for a group will continue to run during each consecutive time slot that is assigned to the group until the task yields to another task in the group through a vehicle such as a GetMessage function call.

Figure 6:
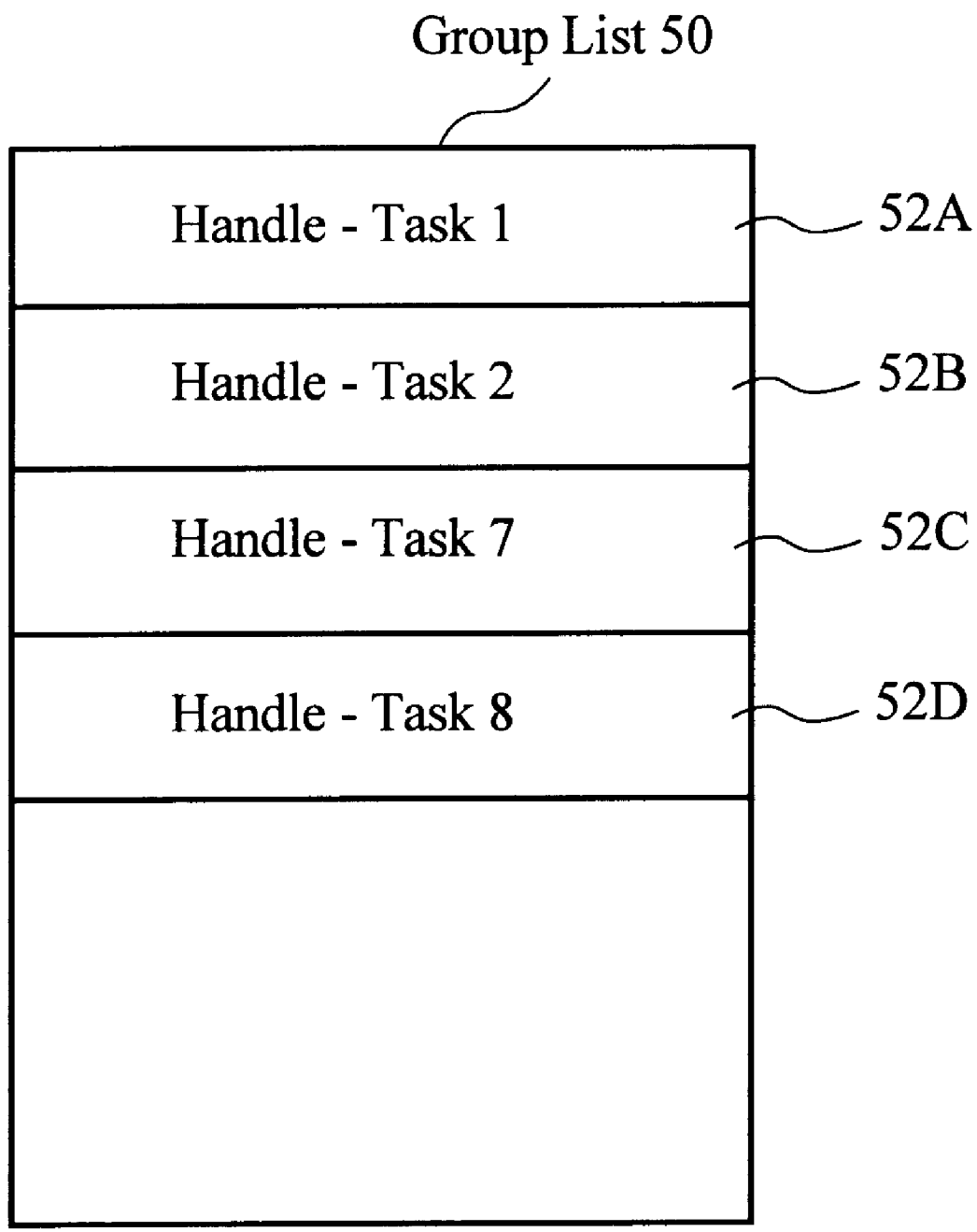
FIG. 6 is an illustration of an exemplary group list employed in the preferred embodiment of the present invention.

The operating system 40 maintains data structures for monitoring what tasks are in each group. The primary data structure for this purpose is the group list 50 (FIG. 6). The group list 50 may be stored in the data area of the operating system 40 in memory 28. The group list 50 includes a respective entry 52A, 52B, 52C, and 52D for each of the tasks included in the group. Each entry 52A, 52B, 52C and 52D holds a handle for a task that is part of the group. A handle is a number that uniquely identifies a task amongst those in the system 26. In the example shown in FIG. 6, the group list 50 includes entries 52A, 52B, 52C, and 52D for four tasks: task 1, task 2, task 7, and task 8.

Figure 7:
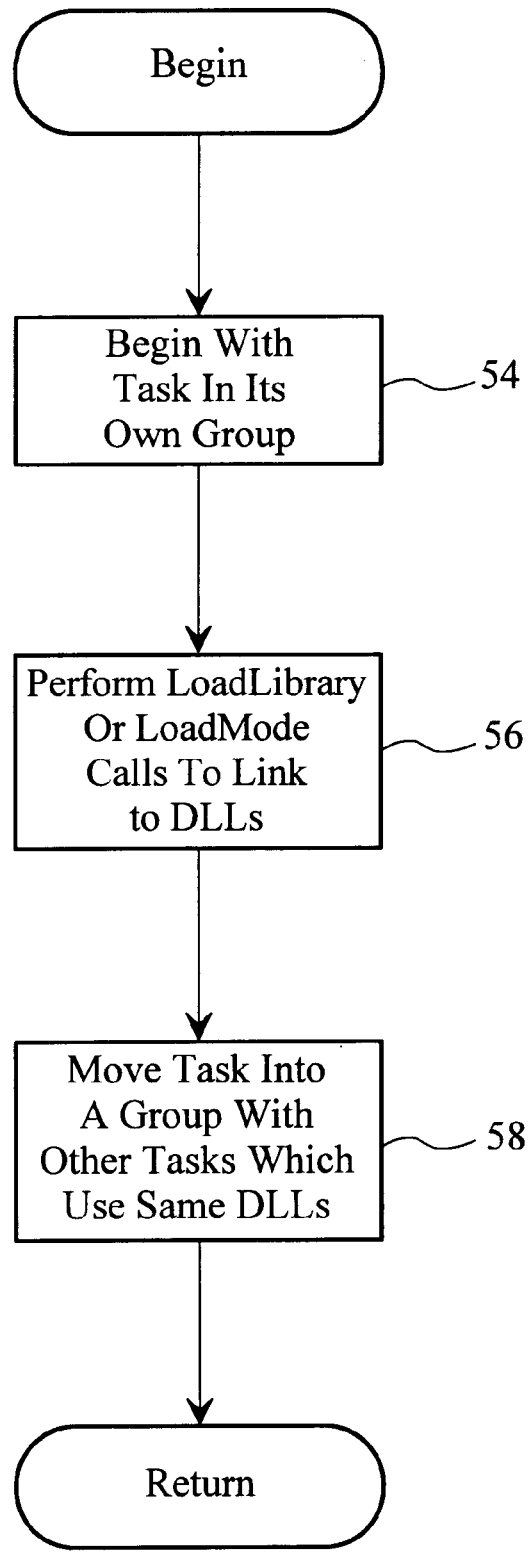
FIG. 7 is a flow chart illustrating the steps performed to merge tasks into a single merged group in the preferred embodiment of the present invention.

The tasks included in group lists may change over time. FIG. 7 is a flow chart illustrating the steps performed to merge groups. Initially, a task begins in its own group (step 54). During the course of execution of the task, the task performs API calls, such as LoadLibrary, LoadModule, WinExec, or certain forms of SendMessage, to link to DLLs (step 56). The operating system 40 moves the task into a group with other applications which use the same DLLs to avoid data sharing problems (step 58).

Figure 8:
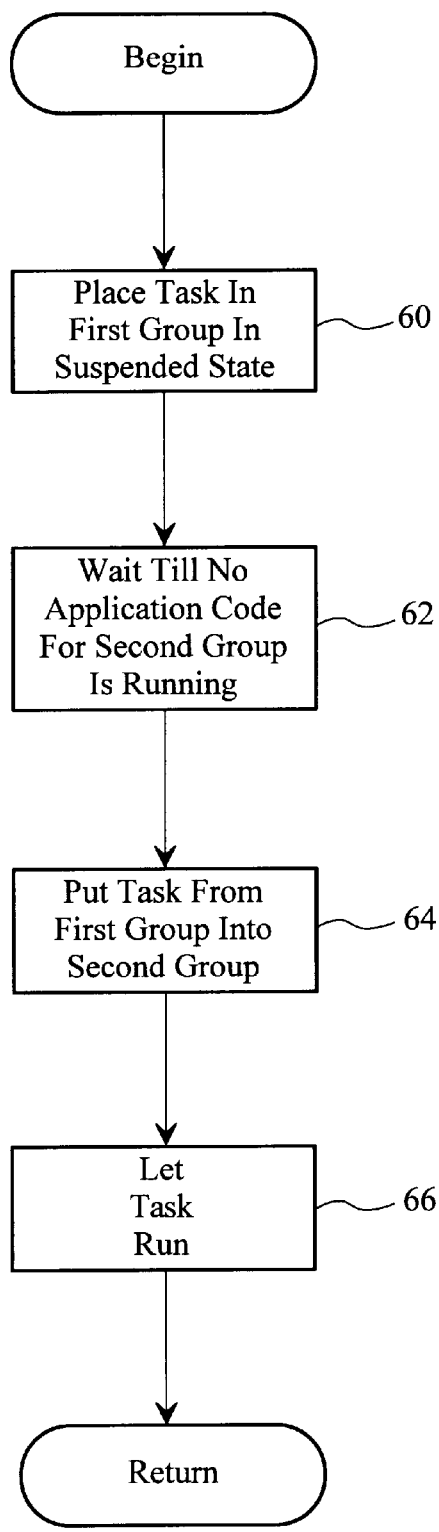
FIG. 8 is a flow chart illustrating in more detail the steps performed to move a task into a group with other tasks which use a same DLL in the preferred embodiment of the present invention.

FIG. 8 is a flow chart illustrating in more detail how step 58 of FIG. 7 is performed to move a task into a group with other tasks. The application to be moved from a first group into a second group is placed into a suspended state, instead of immediately returning from the LoadLibrary or LoadModule API (step 60). The first group is in the "synching-up state" at this point. The operating system 40 waits till no application code for the second group is running (step 62). In other words, it waits till each of the tasks in Group 2 is calling an API like GetMessage, WaitMessage or Yield. The task from the first group is then added to the second group (step 64) and the task may then be scheduled to run (step 66).

In order for the scheduler 42 to properly allocate time slots to groups, it must know the current status of each group and which task, if any, is scheduled for execution during the next time slot that is provided for the group. A group status table 68, like that shown in FIG. 9, is stored by the operating system 40 in memory 28 in order to assist the scheduler 42 in preemptively scheduling tasks from the various groups. In the example shown in FIG. 9, the system 26 currently has four active groups of tasks. A separate entry 70A, 70B, 70C, and 70D is provided for each group. Each of the entries 70A, 70B, 70C, and 70D includes a status field 72A, 72B, 72C, and 72D, respectively. The status fields 72A, 72B, 72C, and 72D hold status information that details whether one of the tasks in the respective groups is scheduled to be running during the next time slot or whether the group is in a "synching-up" state (which will be described in more detail below). The status information may be encoded as groups of bits held in the status fields 72A, 72B, 72C, and 72D. Each entry 70A, 70B, 70C, and 70D also includes a respective task name field 74A, 74B, 74C, and 74D. The task name fields 74A, 74B, 74C, and 74D hold the task names of any tasks that are running during the next available time slot for the groups. Thus, if entry 70A holds status information for group 1, the task name field 74A holds a name (or handle) of the task in group 1 that is running.

Figure 10:
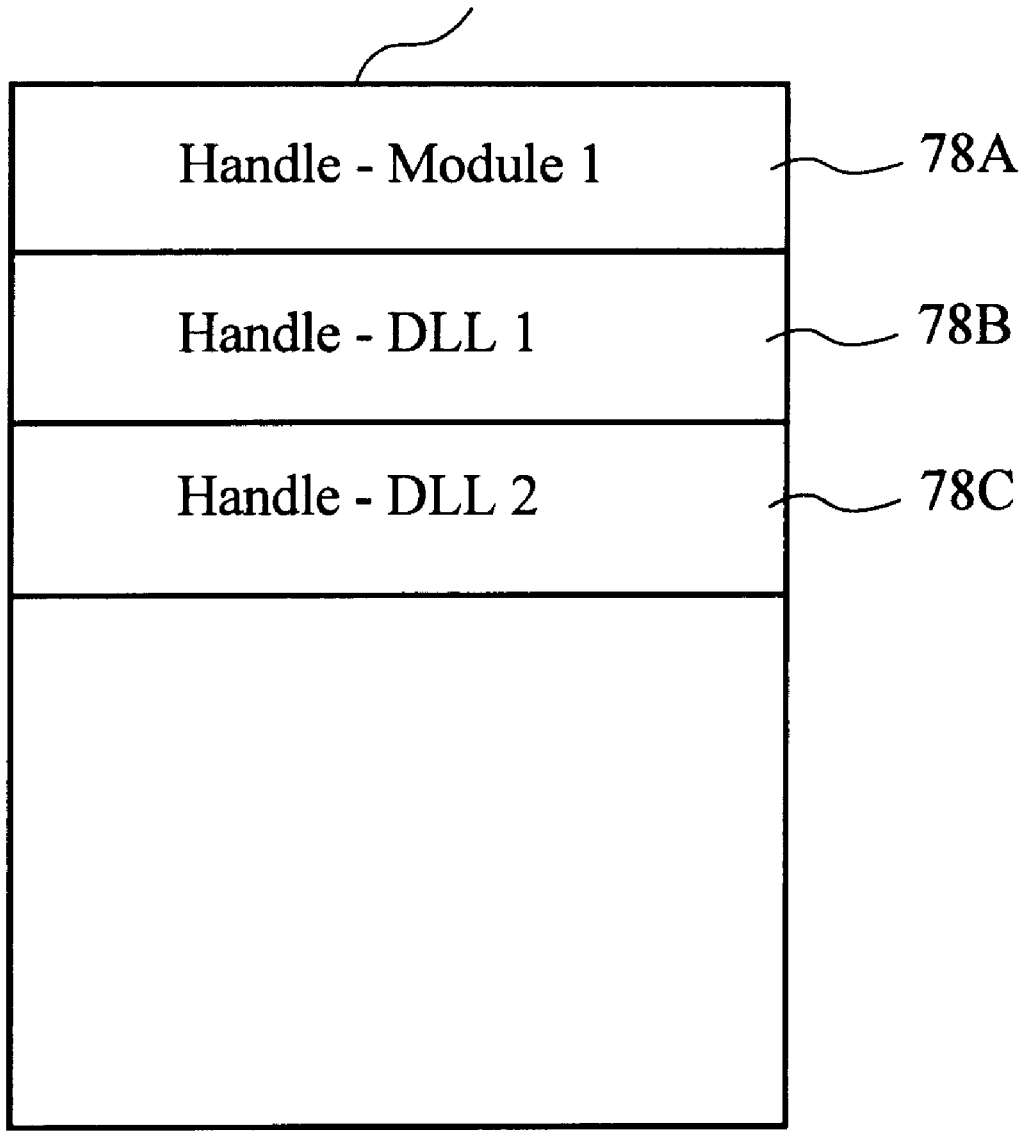
FIG. 10 is an illustration of an exemplary module dependency list used in the preferred embodiment of the present invention.

The operating system 40 also maintains a module dependency list for each of the modules 38. The module dependency list serves a role in assigning tasks/modules to groups when a new task or module is added to a group and when it is determined which group a task will be added to. The module dependency lists are examined to determine what group a task should be assigned. Preemptively scheduled groups always have disjoint module dependency lists. A task/module is put in its own group or in a group with interdependent tasks/modules. An example module dependency list 76 is shown in FIG. 10. Each task may include a single module or multiple modules. The module dependency list 76 lists modules that are candidates to be called or loaded from the associated module. The listed modules and the associated module have an inter-dependency. Entries 64A, 64B, and 64C hold handles for the respective modules. The module dependency list 76 holds entries 78A, 78B, and 78C for each of modules called or loaded from the module associated with the list. In FIG. 10, the module calls or loads module 1, DLL 1, and DLL 2.

Figure 11:
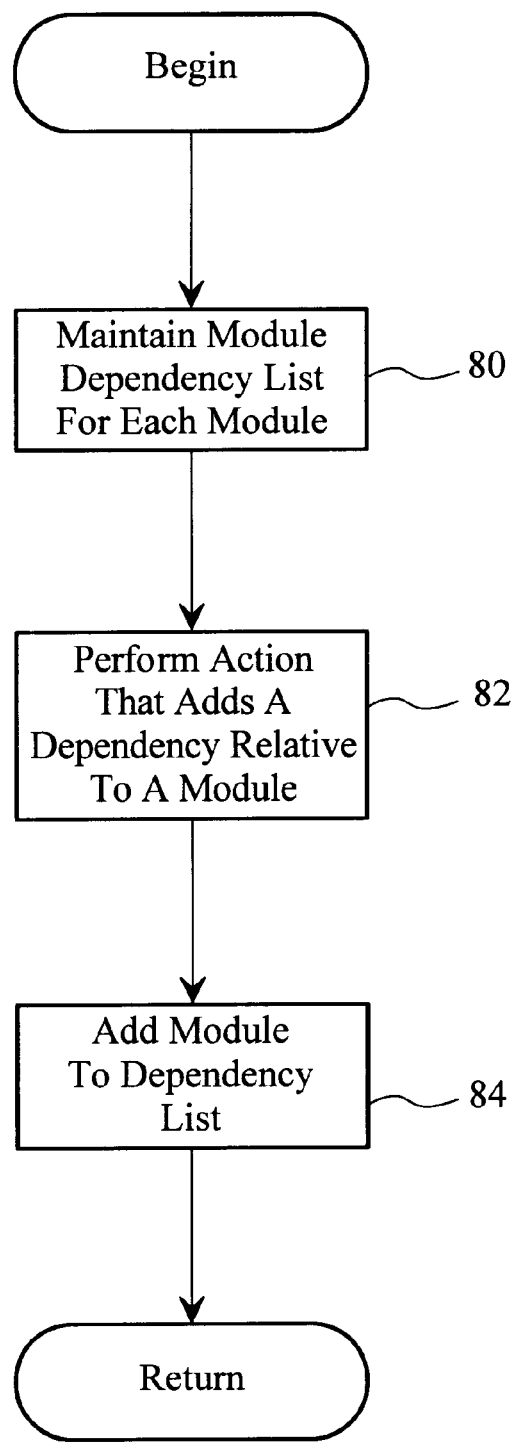
FIG. 11 is a flow chart illustrating the steps performed to grow a module dependency list in the preferred embodiment of the present invention.

The module dependency list 76 is not static; rather the list changes over time. FIG. 11 is a flow chart illustrating the steps performed to update a module dependency list 76 during the course of execution of the associated module. Initially, a module dependency list is maintained for each module (step 80). An action is then performed that adds a dependency relative to the module associated with the list (step 82). This action may include, for instance, loading a library module, loading a DLL module, running an application module, or getting the address of an exported DLL module. In the Microsoft WINDOWS, Version 3.1 operating system, API calls such as LoadLibrary, LoadModule, GetProcAddress and WinExec add a dependency relative to a module. The new modules that are loaded, run or exported by such API calls are then added to the module dependency list (step 84). In this fashion, the module dependency list may dynamically grow during the course of execution of the associated module.

Figure 12:
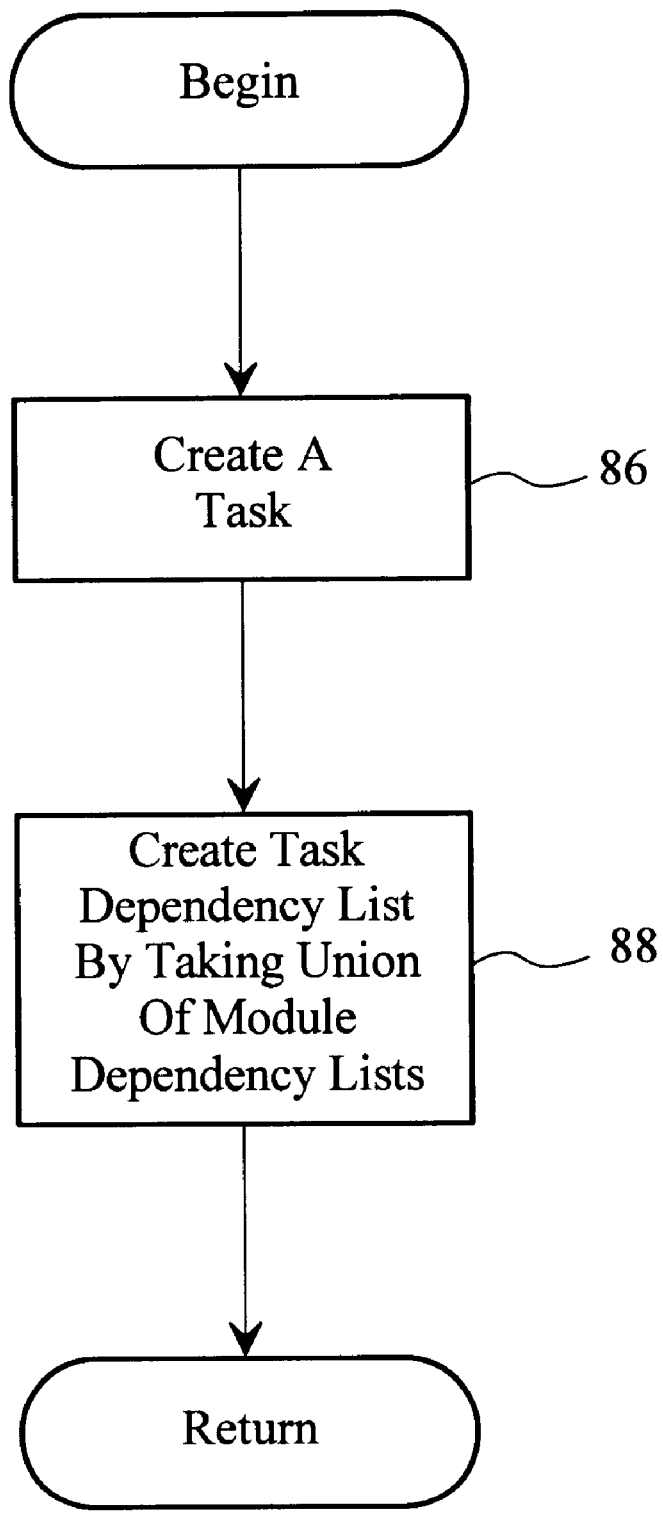
FIG. 12 is a flow chart illustrating the steps performed to create a task dependency list in the preferred embodiment of the present invention.

Since any task may include multiple modules, the issue arises how to develop a module dependency list for a task. FIG. 12 is a flow chart showing the steps performed to create a dependency list for a task. Initially, a task is created (step 86). A task dependency list for the task is then created by taking the union of the module dependency list of the modules of the task (step 88). In this fashion, the preferred embodiment in the present invention ensures that all of the dependencies for a task are taken into account when assigning the task a group.

It is perhaps helpful to summarize the scheduling performed by the scheduler 42. The scheduler assigns time slots for each of the active groups. The scheduler 42 must also determine which task within a group is to be executed or whether the group is in a synching-up state. The currently running task is specified within task name fields 74A, 74B, 74C, and 74D (FIG. 9) of entries 70A, 70B, 70C, and 70D of the group status table 68. The APIs GetMessage, PeekMessage, Yield, and WaitMessage are embellished in the preferred embodiment of the present invention to update the group status table when yielding or blocking. Thus, the group status table 68 contains current information and the appropriate task in each group is scheduled.

While the present invention has been described with reference to a preferred embodiment thereof, those skilled in the art will appreciate that various changes in form and scope may be made without departing from the present invention as defined in the appended claims. For example, the present invention is well suited for use in a distributed system. Moreover, the present invention may be implemented in environments other than the Microsoft WINDOWS, Version 3.1, operating system. Still further, the present invention need not use a single scheduler; rather, multiple schedulers may be used in conjunction.

I claim:

1. In a data processing system having at least one processor for running tasks, wherein running each task involves running at least one module of code, said processor running an operating systems, a method performed by the operating system comprising the steps of:

logically partitioning tasks into groups of interdependent tasks, the interdependency of two tasks being based on whether the two tasks call a common module of code;

preemptively scheduling the groups of interdependent tasks to be run such that each group of interdependent tasks is allocated a time slot in a cycle in which its tasks may run on the processor;

for each group, non-preemptively scheduling the tasks in the group to be run during the time slot allocated to the group;

dynamically updating the partitioning of tasks into groups of interdependent tasks to reflect a change in the interdependency of the tasks in the groups;

updating the preemptive scheduling of groups; and updating the cooperative scheduling of tasks within each group.

2. The method recited in claim 1 wherein the data processing system includes at least one storage device and the method further comprises the step of storing, in the storage device, a group list for each group wherein each group list includes identifying information for the tasks in the group associated with the group list.

3. The method recited in claim 1, further comprising the step of storing status information for each group indicating whether the group has a task that is running and holding identifying information about any task that is running.

4. The method recited in claim 1 wherein the step of logically partitioning tasks into groups of interdependent tasks further comprises the steps of:

initially placing each task in its own group; and subsequently moving the initially placed task into another group of tasks, if the initially placed task calls a module that is called by one task in the other group.

5. In a data processing system having at least one storage device for storing modules of code and at least one processor for running tasks wherein running each task involves running at least one module of code, a method comprising the steps of:

providing a task dependency list for each task, said task dependency list listing modules that are called when the task is run on the processor;

dynamically updating the task dependency list based on a change in which modules are called by the task associated with the task dependency list;

during execution of the tasks, dynamically partitioning the tasks into groups of interdependent tasks based on the task dependency list for each task, the partitioning being based on dependencies between one module of code called by one task and another module of code called by another task;

preemptively scheduling the groups of tasks to be run such that each group of tasks is given a time slot in a cycle in which its tasks may run on the processor; and for each group of tasks, non-preemptively scheduling tasks to be run within each group during the time slot allocated to the group.

6. The method recited in claim 5, further comprising the step of storing a group list for each group that holds identifying information for tasks included in the group.

7. The method recited in claim 5, further comprising the step of storing status information for each group indicating the group has a task that is running and holding identifying information about any task that is running.

8. In a data processing system having at least one storage device for storing modules of code and at least one processor for running tasks, wherein running each task involves running at least one module of code, a method comprising the steps of:

providing a module dependency list for each associated module of code, wherein each module dependency list lists interdependent modules of code of the associated module of code;

generating a task dependency list for each task by taking a logical union of modules listed in the module dependency lists of modules that are loaded or exported when the task is run on the processor;

examining the task dependency lists to logically partition the tasks into groups of interdependent tasks; and preemptively scheduling the groups of tasks to be run such that each group of tasks is given a time slot in a cycle in which its tasks may run on the processor; and for each group of tasks, non-preemptively scheduling tasks to be run within each group during the time slot allocated to the group.

9. The method recited in claim 8, further comprising the step of storing a group list for each group that holds identifying information for tasks included in the group.

10. The method recited in claim 8, further comprising the step of storing status information for each group indicating the group has a task that is running and holding identifying information about any task that is running.

11. In a data processing system having at least one processor for running tasks, wherein running each task involves running at least one module of code, wherein said processor runs an operating system, a computer-readable storage medium holding the operating system, said operating system performing the steps of:

logically partitioning tasks into groups of interdependent tasks based on modules of code called by the tasks;

preemptively scheduling the groups of interdependent tasks to be run such that each group of interdependent tasks is given a time slot in a cycle in which its tasks may run on the processor;

for each group, non-preemptively scheduling tasks to be run within each group during the time slot allocated to the group;

dynamically updating the partitioning of tasks into groups of interdependent tasks to reflect changes in the modules of code called by the tasks;

updating the preemptive scheduling of groups; and updating the non-preemptive scheduling of tasks within each group.

12. The computer-readable storage medium of claim 11, wherein the operating system further performs the steps of:

initially placing each task in its own group; and subsequently moving the initially placed task into another group of tasks, if the initially placed task calls a module that is called by one or more of the tasks in the other group.

13. In a data processing system having at least one storage device for storing modules of code and at least one processor for running tasks wherein running each task involves running at least one module of code, a computer-readable storage medium holding an operating system for performing the steps of:

providing a task dependency list for each task, said task dependency list listing modules that are loaded or exported when the task is run on the processor;

dynamically updating and examining the task dependent lists;

during execution of the tasks, dynamically partitioning the tasks into groups of interdependent tasks based on the examination of the task dependent list;

preemptively scheduling the groups of tasks to be run such that each group of tasks is given a time slot in a cycle in which its tasks may run on the processor; and for each group of tasks, non-preemptively scheduling tasks to be run within each group during the time slot allocated to the group.

14. In a data processing system having at least one storage device for storing modules of code and at least one processor for running tasks wherein running each task involves running at least one module of code, a computer-readable storage medium holding an operating system for performing the steps of:

providing a module dependency list for each associated module of code, wherein each module dependency list lists interdependent modules of code of the associated module of code;

generating a task dependency list for each task by taking a logical union of modules listed in the module dependency lists of modules that are loaded or exported when the task is run on the processor;

examining the task dependency lists;

logically partitioning the tasks into groups of interdependent tasks based on the examination of the task dependency list;

preemptively scheduling the groups of tasks to be run such that each group of tasks is given a time slot in a cycle in which its tasks may run on the processor; and for each group of tasks, non-preemptively scheduling tasks to be run within each group during the time slot allocated to the group.

* * * * *

UNITED STATES PATENT AND TRADEMARK OFFICE
CERTIFICATE OF CORRECTION

PATENT NO. : 6,052,707
DATED : April 18, 2000
INVENTOR(S) : D. D'Souza

Page 1 of 2

It is certified that error appears in the above-identified patent and that said Letters Patent is hereby corrected as shown below:

| COLUMN | LINE | |
|---|---|---|
| [56] Pg. 1, col. 2 | Refs. Cited (Other Publs., Item 1) | "Magzine," should read —Magazine,— |
| [56] Pg. 1, col. 2 | Refs. Cited (Other Publs., Items 4-6) | delete the references |
| [57] Pg. 1, col. 2 | Abstract 4 of text | "a synchronously" should read —asynchronously— |
| 3 | 34 | "a synchronously" should read —asynchronously— |
| 5 | 13 | "such as -GetMessage," should read —such as GetMessage,— |
| 7 (Claim 1, | 25 line 4) | "systems," should read —systems,— |
| 8 (Claim 8, | 34 line 12) | delete "loaded or exported" and insert therefor —candidates to be called— |

UNITED STATES PATENT AND TRADEMARK OFFICE
CERTIFICATE OF CORRECTION

PATENT NO.   :   6,052,707
DATED        :   April 18, 2000
INVENTOR(S)  :   D. D'Souza Page 2 of 2

It is certified that error appears in the above-identified patent and that said Letters Patent is hereby corrected as shown below:

| COLUMN | LINE | |
|---|---|---|
| 9 | 23 | "dependent" should read --dependency-- |
| 9 | 27 | "dependent" should read --dependency-- |

Signed and Sealed this

Fifteenth Day of May, 2001

Attest:

NICHOLAS P. GODICI

*Attesting Officer*   *Acting Director of the United States Patent and Trademark Office*